UNITED STATES PATENT OFFICE.

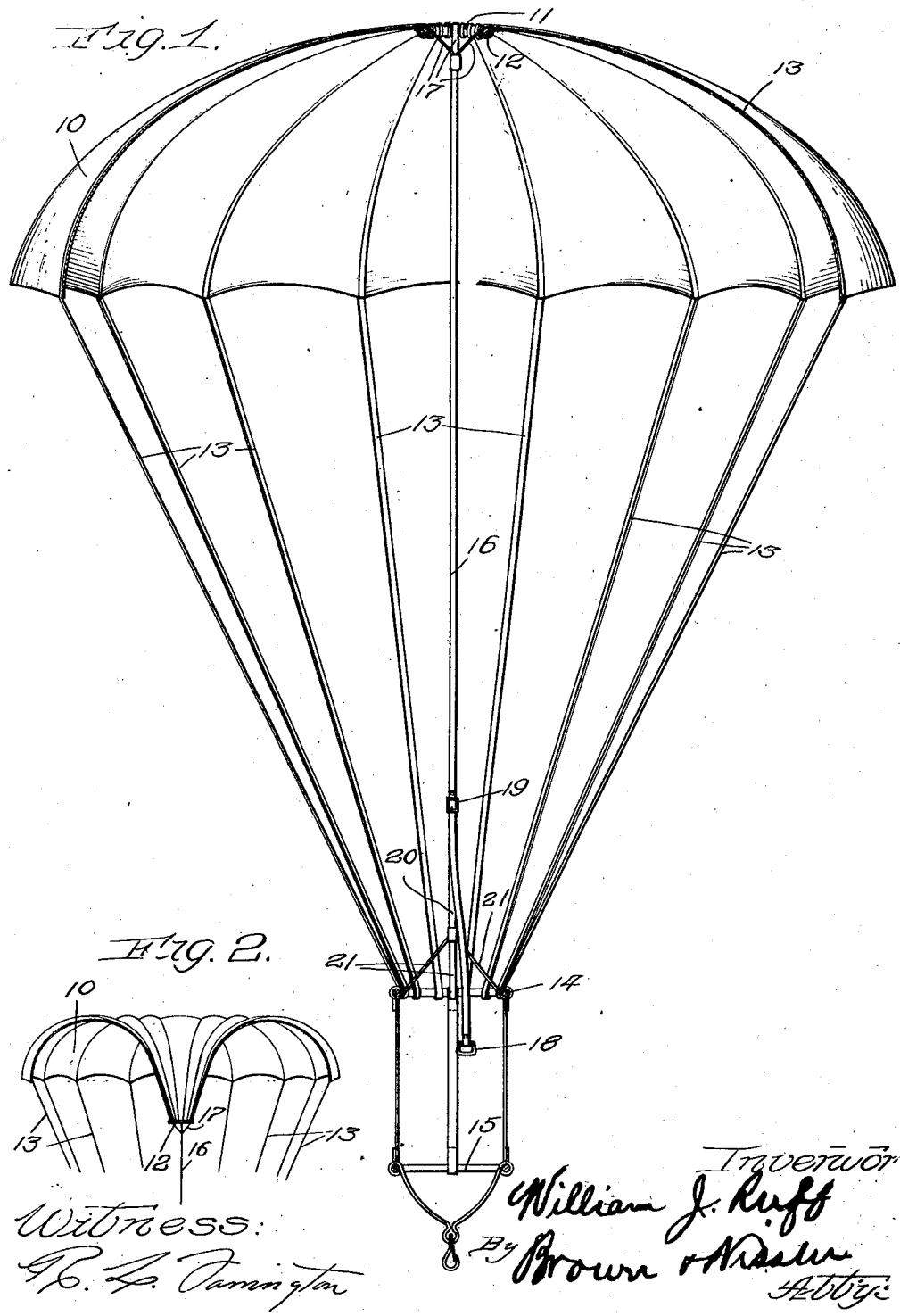

WILLIAM J. RUFF, OF QUINCY, ILLINOIS.

PARACHUTE.

1,353,131.  Specification of Letters Patent.  Patented Sept. 14, 1920.

Application filed September 3, 1918. Serial No. 252,309.

*To all whom it may concern:*

Be it known that I, WILLIAM J. RUFF, a citizen of the United States, residing at Quincy, in the county of Adams and State of Illinois, have invented certain new and useful Improvements in Parachutes, of which the following is a specification.

The object of this invention is to provide a device of the class named which shall be of improved construction and operation. The invention is exemplified in the combination and arrangement of parts shown in the accompanying drawing, and described in the following specification, and it is more particularly pointed out in the appended claims.

In the drawing—

Figure 1 is a vertical sectional view of a parachute embodying one form of the present invention, and Fig. 2 is a view similar to Fig. 1 on a smaller scale and showing the parachute contracted to permit rapid descent.

In modern aeronautics, and especially in aerial warfare, the parachute occupies an important place, especially as a safety device, corresponding somewhat to that of the life-boat in marine navigation, and to be of the greatest service, a parachute should be absolutely reliable and capable of control by the operator. The more quickly a parachute will open when it is released, the less will be the strain placed upon it in arresting the momentum of the falling load, and it is therefore desirable to have means for positively opening the parachute immediately after it is released. There are occasions, however, when it is desirable that the parachute shall descend very rapidly, as for instance when an escape is being made from a burning balloon or airship, or when a descent is being made under fire of an enemy.

In the present invention provision is made for accomplishing both of these desirable features of control in a sure and positive manner, as will be understood from reference to the drawing, in which the numeral 10 designates the flexible material from which the canopy of the parachute is formed. At the upper central portion of the canopy is an opening 11 surrounded by a ring 12 to which the material 10 is secured. The supporting strands, which are preferably in the form of flat tape, are shown at 13 and have their upper ends secured around the ring 12 from which the strands extend outwardly over the periphery of the canopy 10 and thence downwardly to a supporting ring shown at 14. Any approved form of carrier 15 for the aviator may be suspended from the supporting ring 14. Extending through the upright axis of the parachute is a cable 16 which may also be in the form of a flat tape, as illustrated in the drawing. The upper end of the tape 16 is provided with a plurality of strands 17 which have their lower ends secured to the upper end of the cable 16, and their upper ends fast to the ring 12. The lower end of the cable 16 is provided with a handle 18 in position to be grasped by the occupant of the carrier 15. A buckle or other fastener 19 is adjustably connected with the cable 16 and secured to the supporting ring 14 by a short length of cable 20 and a plurality of diverging cords 21. It will be seen that the cables 16 and 20 form a direct connection between the rings 12 and 14 the length of which may be adjusted by shifting the buckle 19.

When the parachute with an aviator carried thereby is released, the weight of the aviator draws downwardly upon the central cable 16 while the resistance of the air forces the periphery of the canopy upwardly and outwardly and thus the parachute is quickly and positively opened at the beginning of the descent, in a manner similar to that described in my prior application, Ser. No. 236,459, filed May 25, 1918, of which this is an improvement. The upward and outward movement of the periphery of the parachute is limited by the strands 13 so that when the parachute is fully opened the weight of the passenger will be distributed over the entire canopy. The opening through the top of the canopy stabilizes the parachute so that the descent will be even and gradual. If for any reason the aviator wishes to descend more rapidly, he grasps the handle 18 and pulls downwardly, partially collapsing the canopy by drawing the central portion inwardly and downwardly as shown in Fig. 2. In this way the sustaining area may be decreased any amount that the exigencies may demand, and the speed of descent will be accordingly regulated, and when the occasion for a rapid descent has passed, the cable 16 may be slackened and the parachute permitted to expand to its normal area so that an easy landing may be accomplished. The ability to decrease the effective area of the parachute makes it possible to use as large a diameter of canopy as may be desired, for the reason that the area may be decreased at any time that the circumstances may demand, and thus the advantages of both a large and a small canopy are available in one parachute. Partially collapsing the parachute by drawing on the cord 16 also stabilizes the parachute in case it has a tendency to sway.

I claim:

1. A parachute comprising a flexible member arranged when open to form a dome-shaped canopy having a central opening therethrough, a ring surrounding said opening and secured to said flexible member, cords having their upper ends connected with said ring and extending outwardly and downwardly over the periphery of said canopy and inwardly and downwardly from said periphery, a weight supporting member carried by said cords at the lower ends thereof, a cable connected with said ring and extending downwardly through the center of said parachute and having its lower end connected with said weight-supporting member, means for adjusting the length of said central cable, and means for exerting tension on said cable at the will of the operator to draw the central portion of said canopy downwardly when it is desired to permit rapid descent of said parachute.

2. A parachute comprising a canopy having an opening at its center; a ring secured to the canopy around said opening; a supporting ring below the first-mentioned ring; a plurality of supporting strands secured to the periphery of the canopy and the supporting ring; an upright cable between said rings and disposed at the axes thereof; a plurality of short cables of substantially equal lengths, one end of each of said short cables being secured to one end of the upright cable and the other ends of said short cables being secured to one of said rings; and a plurality of short strands of substantially equal lengths, each strand having one end secured to the other end of said upright cable and their other ends secured to said other ring.

In testimony whereof I have signed my name to this specification on this 28th day of August, A. D. 1918.

WILLIAM J. RUFF.